Jan. 17, 1956        H. E. HODGSON        2,731,115
FRICTION BRAKE CONSTRUCTION
Filed Feb. 18, 1954        4 Sheets-Sheet 1
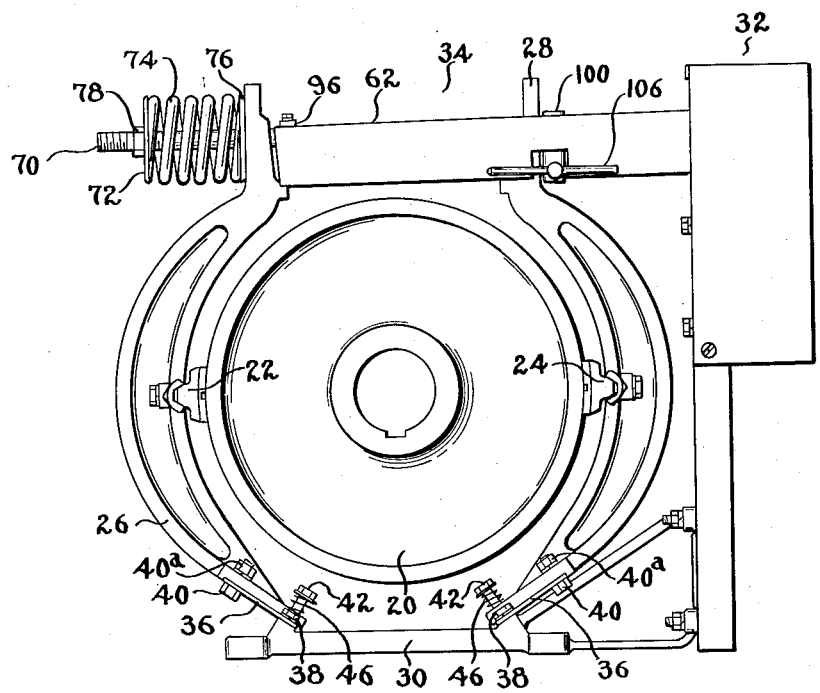
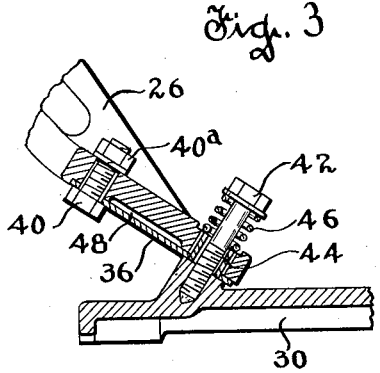
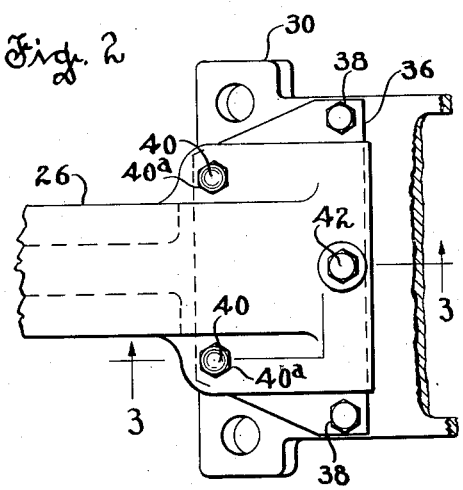
Inventor
Howard E. Hodgson
By W. E. Lyon
Attorney Jan. 17, 1956 H. E. HODGSON 2,731,115
FRICTION BRAKE CONSTRUCTION
Filed Feb. 18, 1954 4 Sheets-Sheet 2
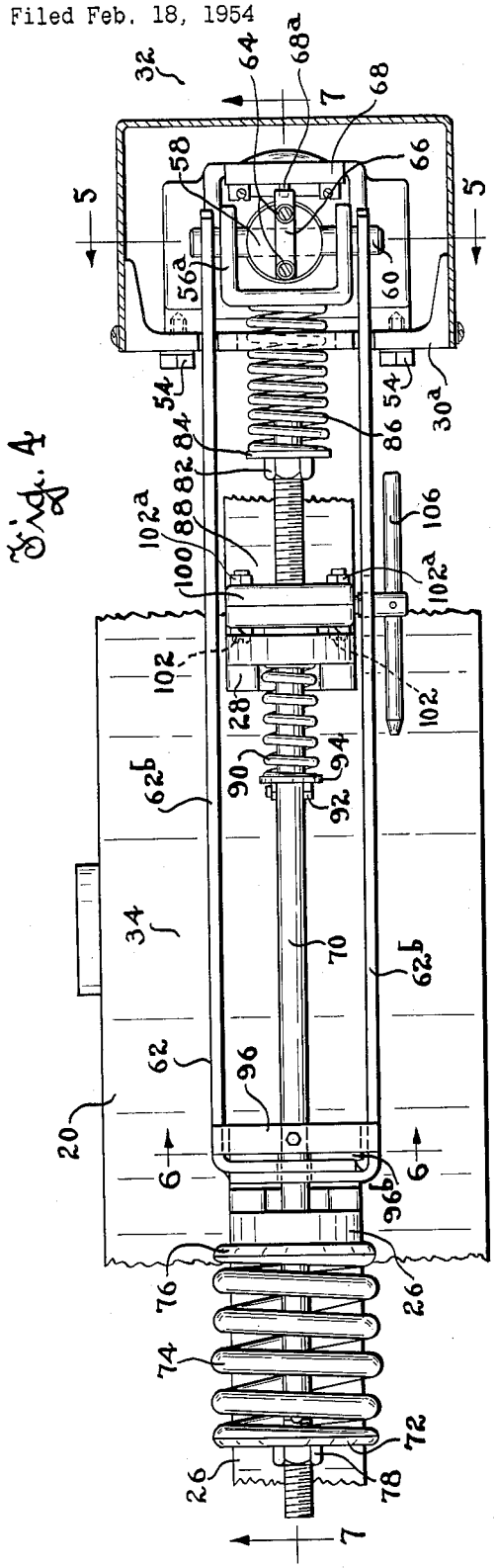
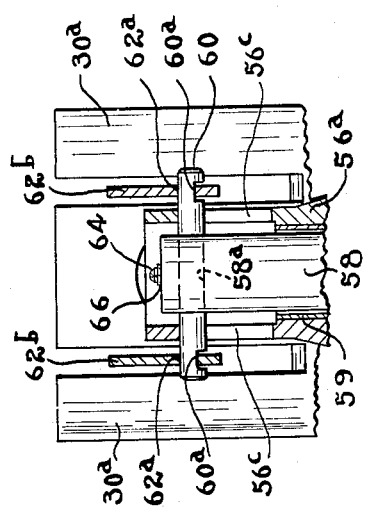
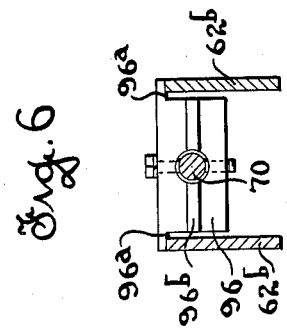
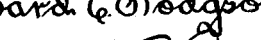
Inventor
Howard E. Hodgson
By W.E.Dixon
Attorney

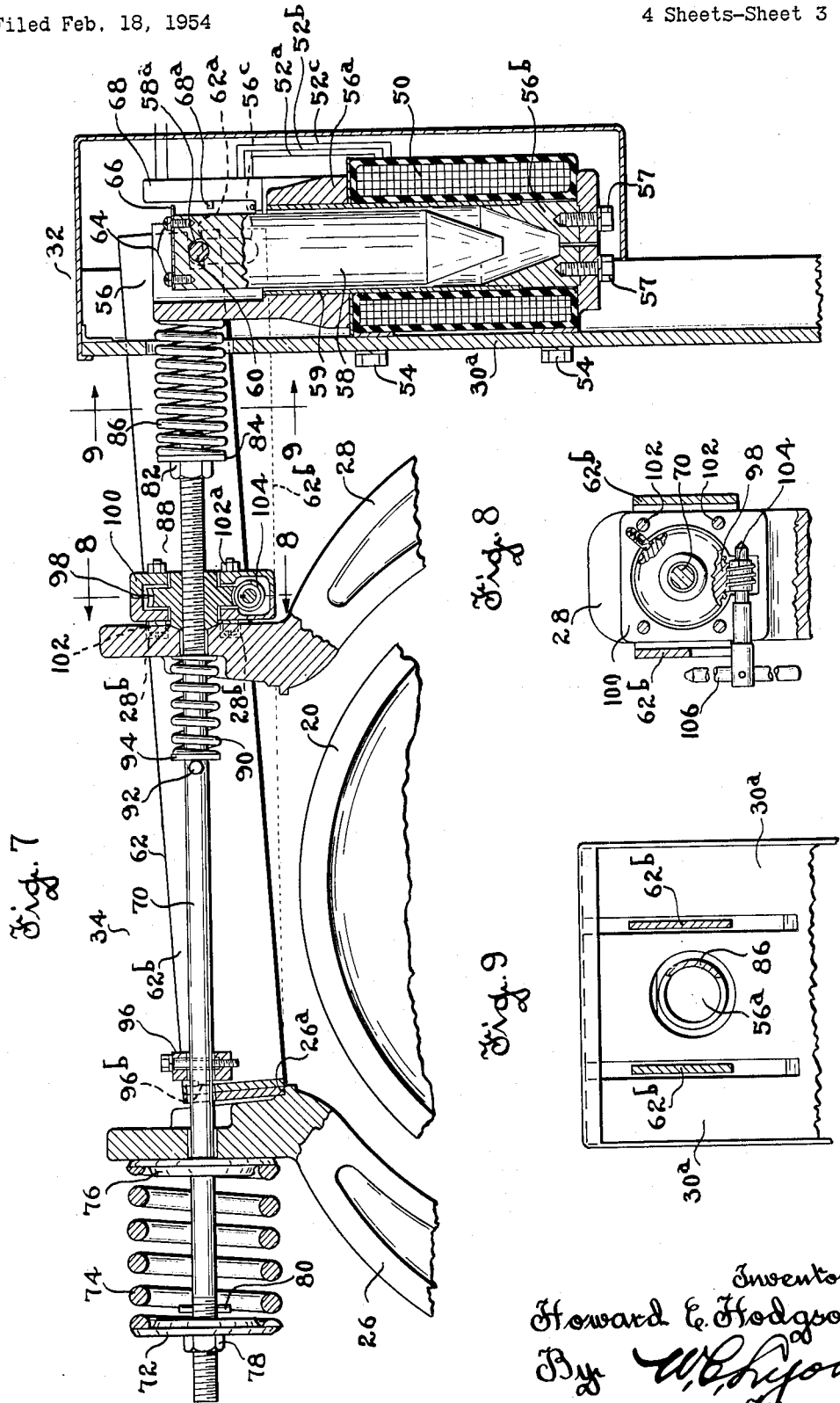

Jan. 17, 1956 — H. E. HODGSON — 2,731,115
FRICTION BRAKE CONSTRUCTION
Filed Feb. 18, 1954 — 4 Sheets-Sheet 4
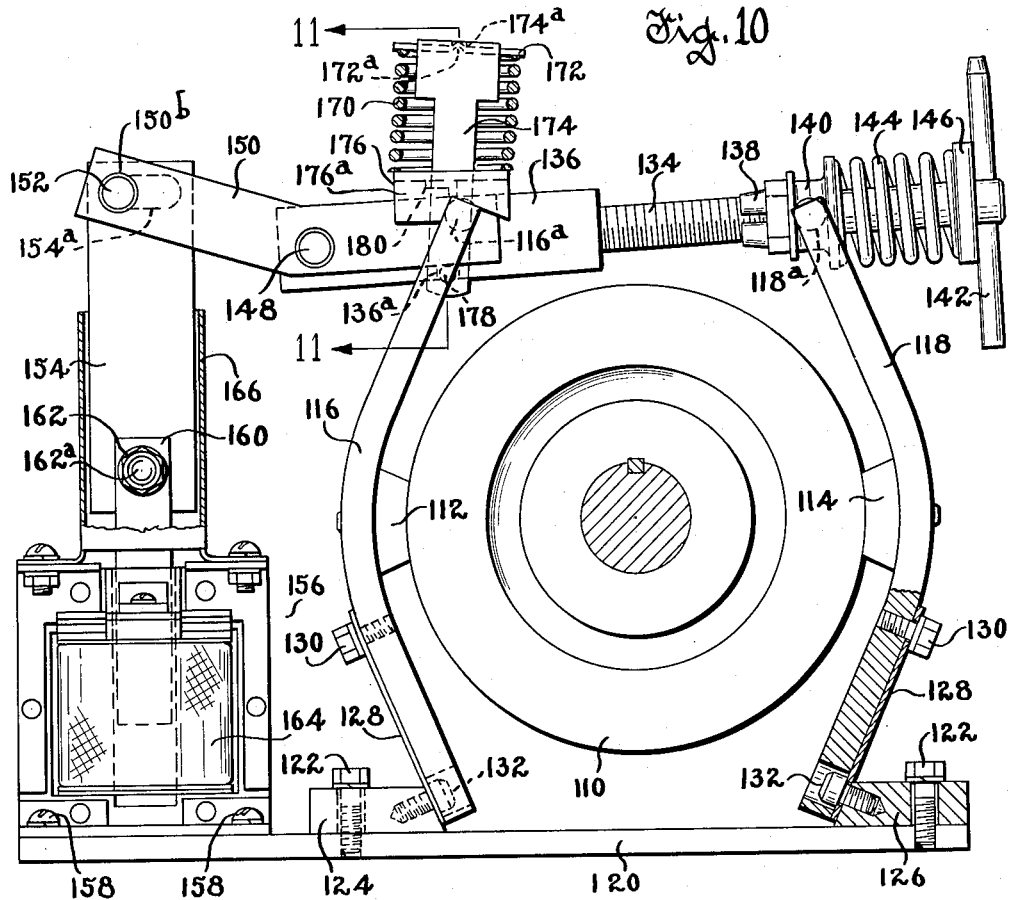
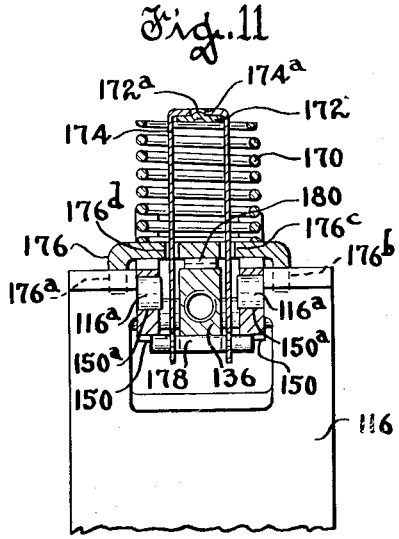
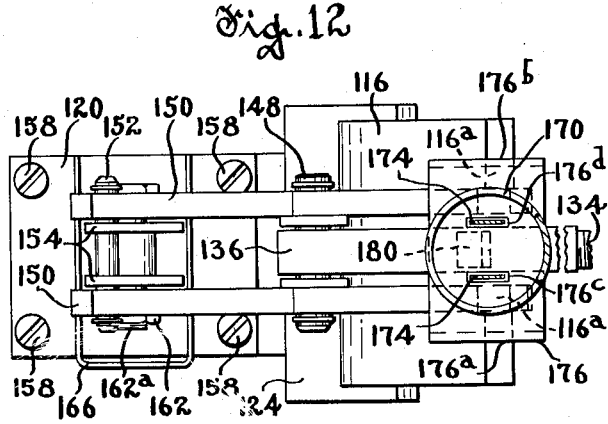
Inventor
Howard E. Hodgson
By W. E. Hyou
Attorney

United States Patent Office

2,731,115
Patented Jan. 17, 1956

2,731,115

FRICTION BRAKE CONSTRUCTION

Howard E. Hodgson, Wauwatosa, Wis., assignor to Cutler-Hammer, Inc., Milwaukee, Wis., a corporation of Delaware Application February 18, 1954, Serial No. 411,183

5 Claims. (Cl. 188—171)

This invention relates to improvements in electromagnetic brakes.

An object of this invention is to provide improved brake shoe operating levers pivotally mounted in a relatively simple and inexpensive manner.

Another object is to provide brake shoe operating lever mounting means comprising a flexible metal strap to enable the operating levers to be easily pivoted.

Another object is to provide an electromagnetic brake operating mechanism which is simple in construction and efficient in operation.

Other objects and advantages will become apparent from the following specification when read in conjunction with the accompanying drawings.

The accompanying drawings illustrate several embodiments of the present invention, it being understood that many modifications of the details of construction and arrangement of the various parts are possible without departing from the spirit and scope of my invention as defined by the appended claims.

In the drawings,

Figure 1 is a side elevational view of one embodiment of my invention;

Fig. 2 is a fragmentary elevational view of a portion of the base member and the pivoted end of one of the shoe levers as shown in Fig. 1;

Fig. 3 is a sectional view taken along line 3—3 of Fig. 2;

Fig. 4 is an enlarged fragmentary top view of the brake operating mechanism shown in Fig. 1;

Fig. 5 is a fragmentary sectional view taken along line 5—5 of Fig. 4;

Fig. 6 is a fragmentary sectional view taken along line 6—6 of Fig. 4;

Fig. 7 is a fragmentary sectional view taken along line 7—7 of Fig. 4;

Fig. 8 is a fragmentary sectional view taken along line 8—8 of Fig. 7;

Fig. 9 is a fragmentary sectional view taken along line 9—9 of Fig. 7;

Fig. 10 is a side elevational view, partly in section, showing a second embodiment of my invention;

Fig. 11 is a fragmentary sectional view taken along line 11—11 of Fig. 10, and

Fig. 12 is a fragmentary top veiw of the brake mechanism shown in Fig. 10.

Like reference characters indicate corresponding parts throughout the several views of the drawings.

Referring to Fig. 1, it illustrates a brake drum 20 to be secured to the shaft of a motor or other device to be braked, opposed brake shoes 22 and 24 for frictionally engaging said drum on opposite sides thereof, and upwardly extending operating levers 26 and 28 to support and operate said brake shoes respectively. The lower ends of levers 26 and 28 are pivotally mounted on a base 30, and an electromagnet assembly 32 also mounted on said base 30 is provided for operation of said brake shoe operating levers.

Operatively associated with said levers 26 and 28, and said electromagnet assembly 32, is a brake operating mechanism 34 to be hereinafter fully described.

As more clearly shown in Figs. 2 and 3, the pivotal mounting means for each of levers 26 and 28 comprises a metal strap 36 formed of flexible sheet material of substantially trapezoidal shape (see Fig. 2). Each of the metal straps 36 is fastened to base member 30 as by means of bolts 38 extending through openings in the strap and threadedly engaging said base member 30. Each of said straps 36 is attached to the respective operating lever by means of bolts 40 and nuts 40ª. The operating levers 26 and 28 are permitted to move in accordance with operation of the brake operating mechanism by flexure of metal straps 36.

The extreme lower end of each of operating levers 26 and 28 is held against its respectively associated strap 36 by a coiled spring 46 which is compressed between the operating lever and the head of a bolt 42. The bolt 42 extends through the operating lever and strap 36 and is threadably engaged in a tapped hole in the base 30. A sleeve 44, interposed between the bolt 42 and the straps 36 and the operating lever, forms a bushing for bolt 42 when the latter is turned to adjust the compression of spring 46. In initially adjusting levers 26 and 28 to insure that shoes 22 and 24 make proper contact with drum 20, bolts 38 are loosened and the levers are rotated as required about their respective bolts 42 after which bolts 38 are tightened.

When the brake is applied against a rotating wheel there is a force tending to lift one shoe lever away from the base. This force is opposed by spring 46. When the brake is applied by drawing together the upper ends of levers 26 and 28, the extreme lower ends of said levers bear against their respectively associated springs 36 and base 30 to afford maximum mechanical advantage in forcing shoes 22 and 24 against drum 20.

As best shown in Fig. 7, the electromagnet assembly 32 comprises a winding 50 attached to a frame 56 which is fastened to the vertical portion 30ª of base member 30 as by means of bolts 54. Said frame 56 comprises a main body portion 56ª to which is attached a plug 56ᵇ as by means of bolts 57. Plug 56ᵇ affords a convenient seat for plunger 58 when winding 50 is energized. As shown in Fig. 7, the lower end portion of plunger 58 is preferabably formed with a substantially conical surface complemental to a surface of plug 56ᵇ. Plug 56ᵇ also assists in locating nad retaining winding 50 in its assembled position. A tube 59 is attached to plug 56ᵇ of the frame 56 and is so positioned within winding 50 so as to provide a central opening for movement therein of plunger 58.

The upper end of plunger 58 is formed with a transverse opening 58ª to accommodate a pin 60. As shown in Fig. 4, the upper end portion of frame 56 is of U-shape in transverse cross-section; the parallel side portions of which are formed with elongated slots 56ᶜ for loose sliding engagement with said pin 60. The end portions of pin 60 are formed with cutouts or slots 60ª which provide for cooperative engagement thereof with slots 62ª formed in a U-shaped brake operating lever 62 (see Figs. 5 and 7). It is thus apparent (see Fig. 7) that energization of magnet winding 50 will effect downward movement of plunger 58 causing pin 60 to be moved downwardly in a straight line.

Attached to the upper end of plunger 58 as by means of bolts 64 is a switch operating plate 66 for cooperation with an operating lever 68ª of an electric swtich 68 (not shown in detail). I prefer to connect switch 68 in the electrical supply circuit for winding 50 of electromagnet assembly 32. Such an arrangement is not uncommon in energizing circuits for electromagnetic brakes since a greater amount of energy is required to move the electromagnet plunger than is required to hold said plunger in its seated position.

The brake operating mechanism 34 comprises the aforementioned U-shaped operating lever 62 which, as seen in Fig. 4, I prefer to form out of a pair of L-shaped members fastened together, as by welding thereof. Also forming a part of the brake actuating mechanism 34 is a pull rod 70 which has both of its ends formed with threads and which extends through openings formed in the top portions of operating levers 26 and 28.

Positioned on said rod 70, as shown in Fig. 7, is a compression spring 74 held in place by spring glands 72 and 76 and an adjusting nut 78. Said nut 78 provides an adjusting feature whereby the compressive force of spring 74 may be changed as desired. I prefer to employ a pin 80 to limit such adjustment to a particular range as required for the specific application of the brake. The other end of rod 70 also is provided with a compression spring 86 which extends through an opening formed in the vertical portion of base member 30 and is held in abutting relation with frame 56 through the use of a nut 82 and a washer 84.

Also attached to pull rod 70 is a stop block 96 as shown in Figs. 6 and 7. Said block 96 is secured to rod 70 by means of a bolt extending through openings in block 96 and rod 70. Block 96 is formed with shoulder portions 96$^a$ which engage the side members 62$^b$, 62$^b$ of operating lever 62. Block 96 is also formed with a raised portion or rib 96$^b$ for abutting engagement with the closed end portion of U-shaped operating lever 62 when assembled (Figs. 4, 6 and 7).

As shown in Figs. 4 and 7 operating lever 62 is formed with an opening for extension therethrough of pull rod 70 and, when assembled, is positioned between block 96 and a ledge 26$^a$ formed on operating lever 26. Said operating lever 62 is positioned so as to be engageable with the aforementioned rib 96$^b$ of block 96.

Adjuster assembly 88 comprises a gear member 98 formed with a centrally disposed threaded opening for engagement with the threaded portion of pull rod 70. Said gear 98 is formed with convex hub portion for abutting relation with the upper end portion of operating lever 28, the latter of which is formed with a surface complemental to said convex hub portion. Said adjuster assembly 88 is formed with an enclosure 100 consisting of two halves held together by means of bolts 102 and nuts 102$^a$. The heads of bolts 102 are caused to engage recesses 28$^b$ of operating lever 28 to prevent relative rotational movement between adjuster assembly 88 and lever 28. Also positioned within enclosure 100 is a worm 104 for engagement with worm gear 98. The shaft of worm 104 extends through an opening in the lower portion of enclosure 100 to permit of adjustment of gear member 98 on the threaded portion of pull rod 70. To provide this adjusting feature, I prefer to employ a manually operable handle 106 (Figs. 4 and 8) which is attached to the end of worm gear 104.

The electromagnetic brake shown in Figs. 1–9, inclusive, operates in the following manner:

Energization of magnet winding 50 is effected in any well known manner from a source (not shown) through electrical leads 52$^a$, 52$^b$, and 52$^c$. Energization of winding 50 effects movement of plunger 58 in a downward direction, thus causing pin 60 and the end of operating lever 62 also to be moved downwardly. Such movement of lever 62 effects rotational movement of said lever 62 about an axis intermediate ledge 26$^a$ of lever 26 and the raised rib 96$^b$ of block 96. As best illustrated in Fig. 7, such rotational movement causes the U-shaped lever 62 to exert a force against block 96 and a force against lever 26. The force exerted against block 96 effects movement of shoe operating lever 28 to its brake release position through rod 70, nut and bolt assembly 92, washer 94, and compression spring 90. The force exerted against shoe operating lever 26, by spring 86, effects movement thereof to its brake release position. The above-described pivotal mounting means comprising spring plates 36 permits both levers 26 and 28 to be moved to their brake release positions in a very simple manner.

I prefer to employ switch 68 to change the electrical connections to winding 50 so that a decrease in the electromagnetic force is effected when plunger 58 is seated against plug 56$^b$.

Upon deenergization of winding 50, compression springs 74 and 86 act jointly to effect rotation of operating lever 62 in a counterclockwise direction. That is, upon deenergization of winding 50 the cumulative compression forces of said springs causes ledge 26$^a$ of lever 26 and rib 96$^b$ of block 96 to move said lever 62 and plunger 58 to their solid line positions as indicated in Fig. 7.

The alternative form of my invention shown in Figs. 10, 11 and 12 comprises a brake drum 110 to be attached to a shaft to be braked. Fig. 10 also shows brake shoes 112 and 114 carried by brake shoe operating levers 116 and 118, respectively, the latter of which cause the shoes to engage and disengage the drum to thus provide for setting and release of the brake.

This embodiment preferably includes a flat base member 120 to which is attached each of a pair of mounting blocks 124 and 126 as by means of a plurality of bolts 122. Said shoe operating levers 116 and 118 are each attached to mounting blocks 124 and 126, respectively, by means of flat spring plates 128. Said plates 128 are each secured to levers 116 and 118 by means of a plurality of bolts 130 and to blocks 124 and 126 by means of a plurality of bolts 132. As illustrated in Fig. 10, bolts 132 are not attached directly to levers 116 and 118, but are positioned within clearance openings therein to permit flexure of spring plates 128 when said shoe operating levers are moved to brake release position and to provide maximum leverage thereof when the brake is set. This pivotal mounting means for the shoe operating levers provides other advantages over the pin connection previously employed as will hereinafter be explained.

The operating mechanism for this embodiment of my invention comprises a main spring 170, a compression spring 144 for forcing linings against the wheel, an electromagnetic means or assembly 156 to release the brake and various mechanisms and linkages hereinafter to be described.

The upper ends of operating levers 116 and 118 are provided with trunnions 116$^a$ and 118$^a$, respectively. Trunnions 116$^a$ are accommodated in openings on one end of each of a pair of levers 150, 150 which are disposed on opposite sides of an elongated, rectangular adjusting nut 136. A pin 148 extending through the central portion of levers 150, 150 and the left end of nut 136 connects these members together so that the levers may rotate with respect to said nut.

Trunnions 118$^a$ connect lever 118 to a spring gland 140 through which extends a shaft 134. The left end of the shaft is threadably engaged in nut 136. The other end of the shaft is provided with a crank handle 142 and a collar or a washer 146. The compression spring 144 is interposed between washer 146 and the gland 140. The latter is free to slide on shaft 134 so that compression spring 144 acts to force together the upper ends of operating levers 116 and 118 to press the linings against the wheel. A lock nut 138, threaded on shaft 34, is interposed between gland 140 and nut 136. The lock nut is disposed so that there is clearance between it and gland 140 when the brake is set. When the brake is to be released, shaft 134 is moved to the right so that lock nut 138 engages gland 140 and lever 118 is rotated clockwise.

The other or left ends of levers 150, 150, at openings

150ᵇ, are connected by a pin 152 to the electromagnet assembly 156 which is fastened to base member 120 by means of bolts 158 and comprises a plunger 160 attached to the aforementioned plunger link 154 by means of nut 162 and bolt 162ᵃ. As winding 164 of electromagnet assembly 156 is energized and deenergized, plunger 160 and link 154 are caused to move in a vertical direction. As shown in Fig. 10, plunger link 154 is guided by member 166 and is formed with a transversely extending elongated slot 154ᵃ at its upper end to permit of translatory movement between said link 154 and operating levers 150.

Special mechanism employed for loading the electromagnet comprises main compression spring 170 positioned between a support plate 172 held against a U-shaped spring retaining bracket 174 and a bracket 176. As best shown in Fig. 11, the open ends of the U-shaped bracket 174 are formed with openings which receive a pin 178. The central portion of said pin 178 fits within a cutout 136ᵃ formed in the lower edge of nut 136. The ends of the pin 178 are extended to be engageable with the underside of each of the levers 150.

Bracket 176 is formed with a pair of down-turned side portions 176ᵃ and 176ᵇ, each of which is formed with an angular notch to fit against the upper portion of shoe operating lever 116. Bracket 176 is also formed with clearance openings 176ᶜ and 176ᵈ which receive the side portions of the U-shaped bracket 174. A small angularly bent stop member 180 is attached to the lower side of bracket 176 as by welding.

Support plate 172 rests against the end of U-shaped bracket 174 and is held in place by the force exerted by spring 170. A detent 172ᵃ for engagement with opening 174ᵃ is formed in plate 172 to effect positioning thereof with respect to bracket 174.

When the electromagnet is energized, plunger link 154 and the left ends of levers 150, 150 are pulled downward. The levers pivot about trunnions 116ᵃ and pin 148 moves downward. In moving downward, pin 148 moves through a larger angle with respect to trunnions 116ᵃ than with respect to trunnions 118ᵃ so that the horizontal component of the distance between pin 148 and trunnions 116ᵃ is reduced by more than is the horizontal component of the distance between pin 148 and trunnions 118ᵃ. Therefore, the trunnions 116ᵃ and 118ᵃ and the upper ends of operating levers 116 and 118 are separated.

For proper release of the brake, levers 116 and 118 must rotate counterclockwise and clockwise, respectively, so that both of shoes 112 and 114 are disengaged from drum 110. When the left ends of levers 150 are pulled down, nut 136 moves down carrying pin 178 away from levers 150. Thereafter spring 170 exerts a force between pin 178 and the point of connection of bracket 176 and lever 116 which tends to return the levers 150 and nut 136 to their original positions relative to each other. The line of action of this force is at the right of the point of connection of the lever 116 to base 120, so that it tends to return lever 116 to "set-brake" position. The same force tends to pull nut 136 upward toward the right ends of levers 150 so that, upon downward movement of the left ends of levers 150, nut 137 tends to rotate about pin 178 whereupon lever 118 is tended to be pulled to "set-brake" position. These tendencies are balanced and act, when the top ends of levers 116 and 118 are spread to release the brake to provide equal clearance between their respective shoes and the drum.

A further important factor in assuring this result is that each of springs 128, 128, will flex a like amount. If one is flexed more than the other, the greater force stored in it will operate to increase the flexure of the other and re-aline levers 116 and 118 for equal shoe clearance.

In the set condition of the brake, a small clearance is provided between gland 140 and lock nut 138. This clearance provides a wear allowance for the brake shoes. The wear allowance in the embodiment illustrated is small so that the brake will "burn-free" if the brake should be set while the device to which it is attached continues to rotate.

The wear allowance and the clearance between the shoes and the drum when the brake is released are adjusted simultaneously by turning crank 142.

The pressure of the brake linings against the drum face is determined by the spring 144, which is adjusted to a predetermined length by means of nut 138 during assembly.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. The combination in a magnetically operated friction brake having a base member, a brake drum, a brake lining for engagement with said drum, an operating lever carrying said lining, and selectively operable means associated with said operating lever to effect engagement and disengagement of said drum and said lining, of pivotal mounting means for said operating lever comprising a flexible metal strap attaching said lever to said base for support thereby and for pivotal movement thereof in response to actuation of said operating means.

2. The combination in a magnetically operated friction brake having a base member, a brake drum, a brake lining for engagement with said drum, an operating lever carrying said lining, and selectively operable means associated with said operating lever to effect engagement and disengagement of said drum and said lining, of pivotal mounting means for said operating lever comprising a flexible metal strap fixed to said base and to said lever intermediate the ends thereof.

3. In combination in a magnetically operated friction brake, a base member, a brake drum, a brake lining for engagement with said drum, an operating lever carrying said lining, and selectively operable means associated with said operating lever to effect engagement and disengagement of said drum and said lining, and pivotal mounting means for said operating lever comprising a flexible metal strap having one of its ends attached to said base and its opposite end attached to said lever at a predetermined distance from one end of said lever whereby upon movement of said lever to disengage said lining from said drum said strap is flexed, said one end of said lever extending toward the base and acting when said means is operated to engage said lining and said drum to exert a force against the base whereby maximum leverage is afforded said means.

4. An operating mechanism for an electromagnetic brake having a brake drum, oppositely disposed brake linings and individual pivotally mounted operating levers therefor, comprising: (a) operating means including an operating shaft and means to prevent substantial relative movement of said shaft with respect to one of said operating levers, (b) a rotatable operating lever associated with said shaft and the other of said levers to effect relative movement of said shaft and said last mentioned lever in opposite directions when rotated, (c) electromagnetic means having a reciprocable plunger attached to said rotatable operating lever and energizable to effect rotation of said rotatable operating lever, and (d) biasing means associated with said shaft and said other of said levers to effect return of said operating levers upon deenergization of said electromagnetic means.

5. An operating mechanism for an electromagnetic brake having a brake drum, oppositely disposed brake linings and individual pivotally mounted operating levers therefor, comprising, (a) operating means including an operating shaft extending through openings in said operating levers and means associated with said shaft and one of said levers to prevent substantial relative movement therebetween, (b) a block attached to said shaft near the other of said operating levers, (c) a rotatably operable lever positioned between said block and the other of said operating levers to move said operating levers and brake shoes away from said drum when rotated, (d) electromagnetic means having a reciprocable plunger associated with said rotatably operable lever to effect rotation thereof when energized, and (e) a spring mounted on said shaft in abutting relation with the other of said operating levers to effect return of said operating levers and brake shoes toward said brake drum upon energization of said electromagnetic means.

References Cited in the file of this patent

UNITED STATES PATENTS 1,166,725     Trezise     Jan. 4, 1916